United States Patent [19]

Age

[11] Patent Number: 5,077,028
[45] Date of Patent: Dec. 31, 1991

[54] MANUFACTURING HIGH PURITY/LOW CHLORINE CONTENT SILICON BY FEEDING CHLOROSILANE INTO A FLUIDIZED BED OF SILICON PARTICLES

[75] Inventor: Shuichi Age, Amagasaki, Japan

[73] Assignee: Osaka Titanium Co., Ltd., Hyogo, Japan

[21] Appl. No.: 489,265

[22] Filed: Mar. 6, 1990

[30] Foreign Application Priority Data

Mar. 6, 1989 [JP] Japan .................................. 1-53489

[51] Int. Cl.$^5$ .............................................. C01B 33/02
[52] U.S. Cl. ..................... 423/350; 427/213; 427/215; 427/255; 427/255.1; 427/255.2
[58] Field of Search ............ 427/213, 215, 255, 255.1, 427/255.2; 423/349, 350

[56] References Cited

U.S. PATENT DOCUMENTS

| | | | |
|---|---|---|---|
| 3,012,861 | 12/1961 | Ling | 427/213 |
| 4,207,360 | 6/1980 | Padovani | 427/213 |
| 4,314,525 | 2/1982 | Hsu et al. | 427/213 |
| 4,318,942 | 3/1982 | Woerner et al. | 427/213 |
| 4,416,913 | 11/1983 | Ingle et al. | 427/212 |
| 4,684,513 | 8/1987 | Iya | 427/213 |
| 4,868,013 | 9/1989 | Allen | 427/213 |
| 4,900,411 | 2/1990 | Poong et al. | 427/213 |

Primary Examiner—Shrive Beck
Assistant Examiner—Benjamin L. Utech
Attorney, Agent, or Firm—Oblon, Spivak, McClelland, Maier & Neustadt

[57] ABSTRACT

A method of manufacturing high-purity silicon crystals, which comprises depositing silicon on the surface of high-purity silicon particles, while feeding into a fluidized bed reactor at a high temperature a material gas consisting of high purity chlorosilane and a diluting gas, said method having a silicon deposition rate in excess of about 0.4 μm/min.

13 Claims, 6 Drawing Sheets

MANUFACTURING HIGH PURITY/LOW CHLORINE CONTENT SILICON BY FEEDING CHLOROSILANE INTO A FLUIDIZED BED OF SILICON PARTICLES

BACKGROUND OF THE INVENTION

1. Field of the Invention

The present invention relates to a method of manufacturing high-purity polycrystalline silicon granules which is suited for use in a CZ process.

2. Description of the Background

As manufacturing methods of polycrystalline silicon, the Siemens process and the fluidized bed granulation process are available. According to the Seimens process, which is a type of chemical vapor deposition (CVD) process, chlorosilane in gaseous state is fed into a reactor, while heating by energization a thin silicon rod which is arranged in a bell jar reactor. The chlorosilane gas fed into the reactor forms silicon by thermal decomposition/hydrogen reduction, which is then deposited on the thin silicon rod, thereby effecting silicon growth. This method of manufacturing polycrystalline silicon is currently a mainstay, however, the method affords a low efficiency, being basically a batch system. In addition, this method is problematic because the silicon deposition surface area is small, as compared with the reactor capacity, and heat radiation from the bell jar reactor surface is large.

Figure 4:
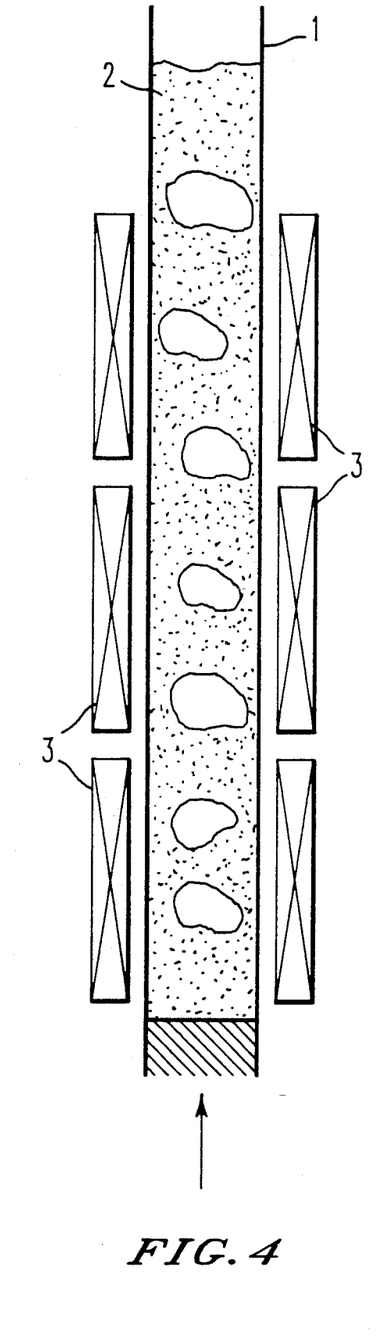
FIG. 4 illustrates the fluidized bed granulation process.
Figure 5A:
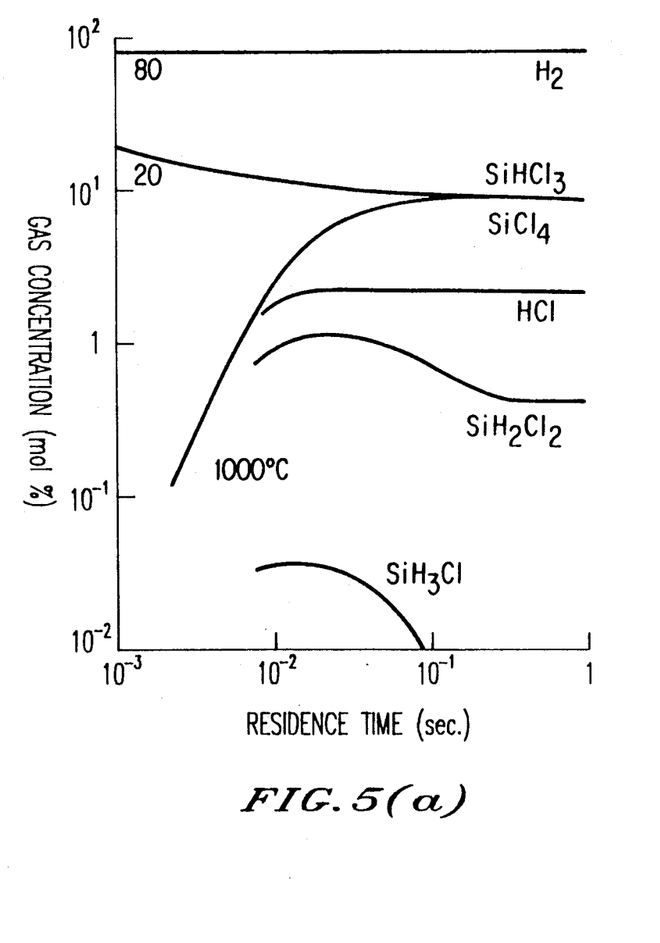
FIG. 5 represents graphs which show the time dependent changes in respective gas compositions.
Figure 5B:
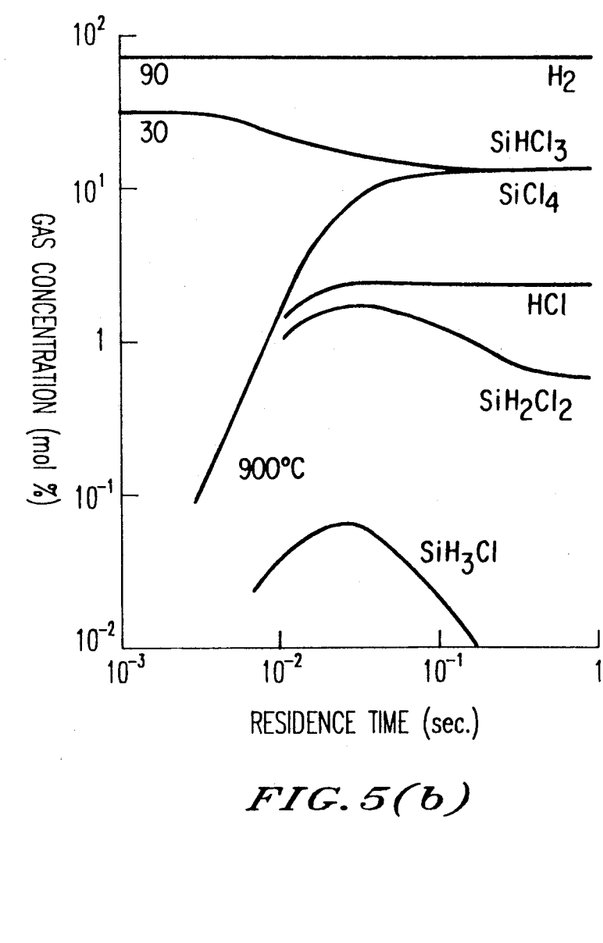
Figure 5C:
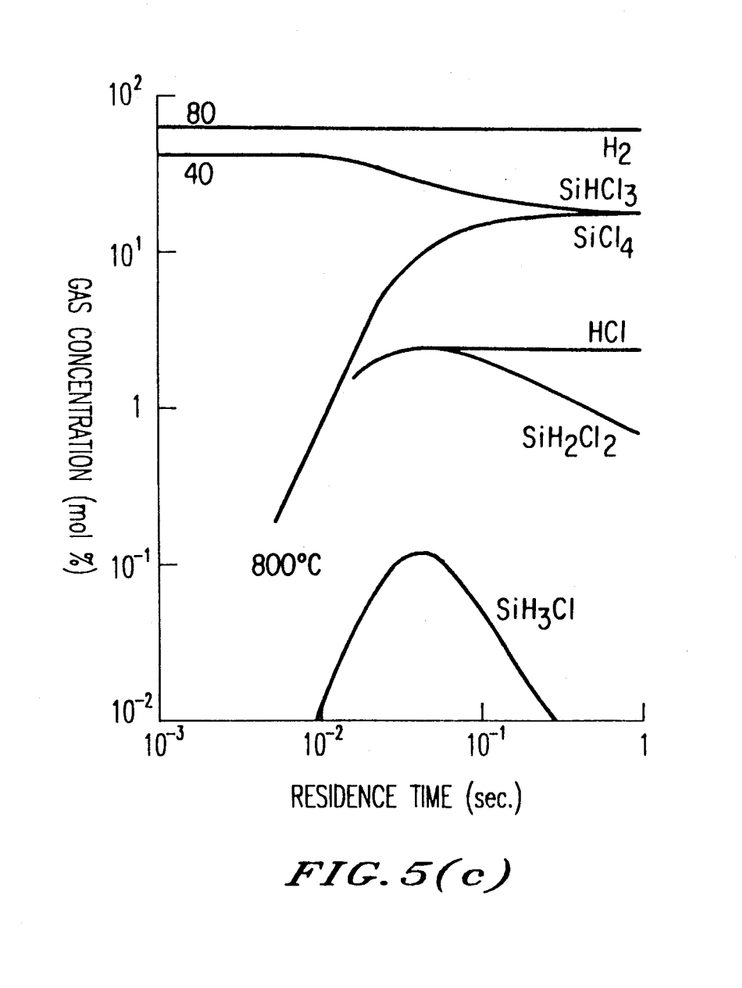
Figure 5D:
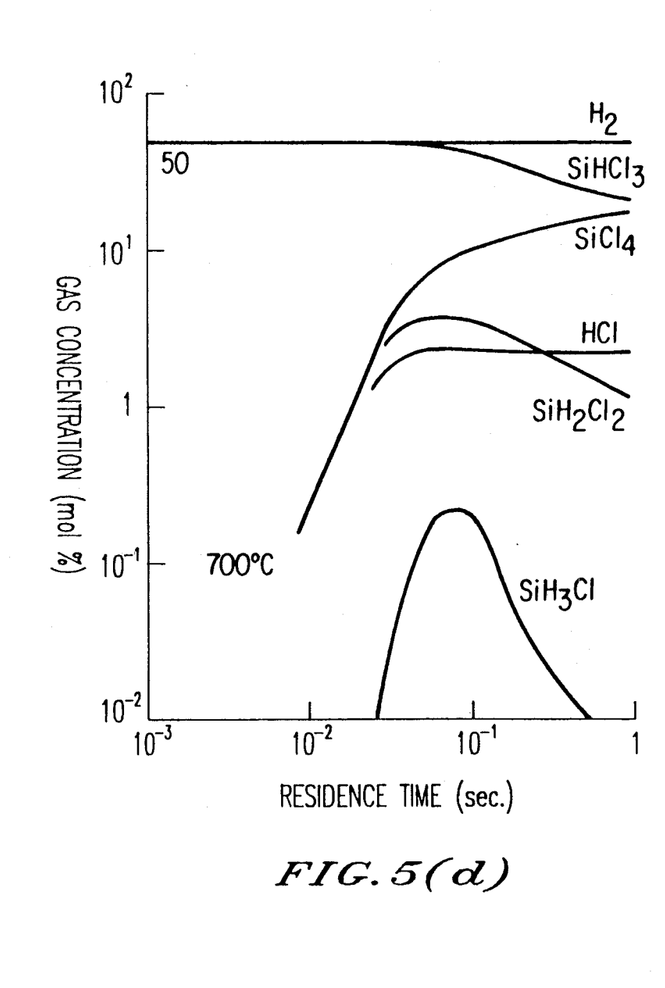

At present, a fluidized bed granulation process is being developed for the manufacture of polycrystalline silicon. According to the fluidized bed granulation process, as shown in FIG. 4, deposition of silicon is made on granular silicon particles 2 as the material in a cylindrical reactor 1 which is called fluidized bed reactor. Thus, this method is, in principle, a type of CVD process, similar to the Seimens process.

According to this method, the inside of reactor 1 is heated by outside heaters 3 and into reactor 1, are fed, from above, silicon particles and, from below, the material gas containing chlorosilane. The silicon particles 2 fed into reactor 1 form a fluidized bed with the reaction gas which is rising inside reactor 1. The material gas is heated by the heaters in the process of rising inside the reactor 1, thereby undergoing thermal decomposition/hydrogen reduction, yielding silicon, which is deposited on the surface of the silicon particles 2, which form the fluidized bed.

The fluidized bed granulation method of manufacturing polycrystalline silicon is a continuous system and the ratio of the silicon deposition surface area to the capacity of the reactor is drastically larger, as compared with that in the Seimens process. A notable advantage in productivity and power consumption is also obtained. Consequently, this enables a large reduction of manufacturing cost. Since the high purity polycrystalline silicon manufactured by the fluidized bed granulation process is granular, it will, in all likelihood, have applications such as the material for solar batteries, or as the charging material in manufacturing single crystalline silicon by the CZ process. Czochralski (CZ) process is a method of producing single crystals from molten material and is used to prepare silicon single crystals.

Important parameters in the fluidized bed granulation process include fluidized bed temperature, chlorosilane concentration in the material gas, material gas flow velocity, diameter of polycrystalline silicon particles, fluidized bed height and the time taken by silicon particles to pass through the fluidized bed, for example.

With regard to the material gas temperature, overheating at the preheating stage will cause deposition; therefore the preheating temperature should be kept below 300° C.

The material gas temperature inside the reactor is controlled to about 900°–1,100° C. for prevention of silicon deposition on the reactor wall.

The chlorosilane concentration is controlled to about 20-50%, because at higher concentrations, fine powders are formed called fume, which brings about interparticular cohesion.

The gas flow velocity is selected at 60–200 cm/sec, taking account of overall reaction efficiency, productivity and operational troubles.

The average diameter of fluidized particles, is preferably greater than 0.8 mm. If it is smaller than 0.5 mm, the flow rate of the gas parts where particles are dense, as specified by the minimum fluidizing velocity (Umf), so that even if the material gas feed rate is increased, it will tend to blow through as bubble gas. As a consequence, the silicon deposition velocity does not increase in proportion to the increasing amounts of the material fed. Thus, the average diameter of fluidized particles should desirably be higher than 0.8 mm, more preferably higher than 1 mm.

The dwell time or residence time of the reaction gas in the fluidized bed is empirically selected at about 0.5–2.0 sec. The dwell time is determined by dividing the height of the fluidized bed by the flow velocity of the material gas.

Under these conditions, the silicon deposition velocity is around 0.1 $\mu$m/min. It is at this level that the development of the fluidized bed granulation process is presently occurring.

The silicon deposition rate means the average deposition rate, G, which is obtained by dividing the volume increase rate of silicon by the total surface area of silicon particles. The volume increase rate is obtained by dividing the weight increase rate by the density $\rho$(2.33 g/cm$^3$) of silicon crystal. The total surface area, S, may be determined, for example, from the average particle size, d, by $S=V(1-\epsilon) \cdot (6/d)$ or $S =(W/\rho)\cdot(6/d)$. Where V designates bulk volume of particle, W weight, and $\epsilon$ voids.

Despite the progress being made with the fluidized bed granulation process, it has recently been determined by the present inventor that about 50-200 ppm by weight of chlorine remains in the polycrystalline silicon manufactured under such condition. The residual chlorine is not only absorbed by the surface of the granules, but exists also in their interior in abundance. On this account, the residual chlorine can not effectively be removed by after-treatments such as a vacuum high temperature treatment, for example. If chlorine remains in the interior of the granules, as the granules are charged into molten silicon in a crucible, the chlorine inside the granules will expand; thereby scattering the molten silicon. As a result, adaptation of such a product to many processes, such as the CZ process, is not feasible.

Thus, a need continues to exist for a method of manufacturing high purity polycrystalline silicon granules, which granules have a greatly reduced residual chlorine content.

SUMMARY OF THE INVENTION

Accordingly, it is an object of the present invention to provide a process for manufacturing high-purity polycrystalline silicon granules, which have a greatly reduced amount of residual chlorine therein.

This object and others, which will become more apparent, are provided by a process for manufacturing high-purity polycrystalline silicon granules, which entails depositing silicon on the surface of high-purity silicon particles, while feeding into a fluidized bed at a high temperature a material gas consisting of high-purity chlorosilane and a diluting gas, wherein a silicon deposition rate in excess of about 0.4 μm/min. is effected.

BRIEF DESCRIPTION OF THE PREFERRED EMBODIMENTS

DETAILED DESCRIPTION OF THE PREFERRED EMBODIMENTS

The sources of the chlorine which remains in the high purity polycrystalline silicon granules manufactured by the fluidized bed granulation process is the chlorine content which is contained in the chlorosilane of the material gas. If so, the residual chlorine concentration may be considered to be governed by the chlorosilane concentration in the material gas. However, when the effect of chlorosilane concentration on residual chlorine concentration was examined by altering the former, no intimate correlation was found between them. Moreover, the effect of reaction temperature on residual chlorine concentration is very weak.

The present inventor has considered the residual chlorine concentrations in Si extracted from different parts of the fluidized bed reactor by neutron activation analysis. The reaction conditions are: particle size, 0.6–1.6 mm; flow velocity, 60–160 cm/sec; SiHCl$_3$, used as chlorosilane; and the mol ratio of SiHCl$_3$/H$_2$, 1. The fluidized bed height is 1,500 mm (constant).

Figure 3:
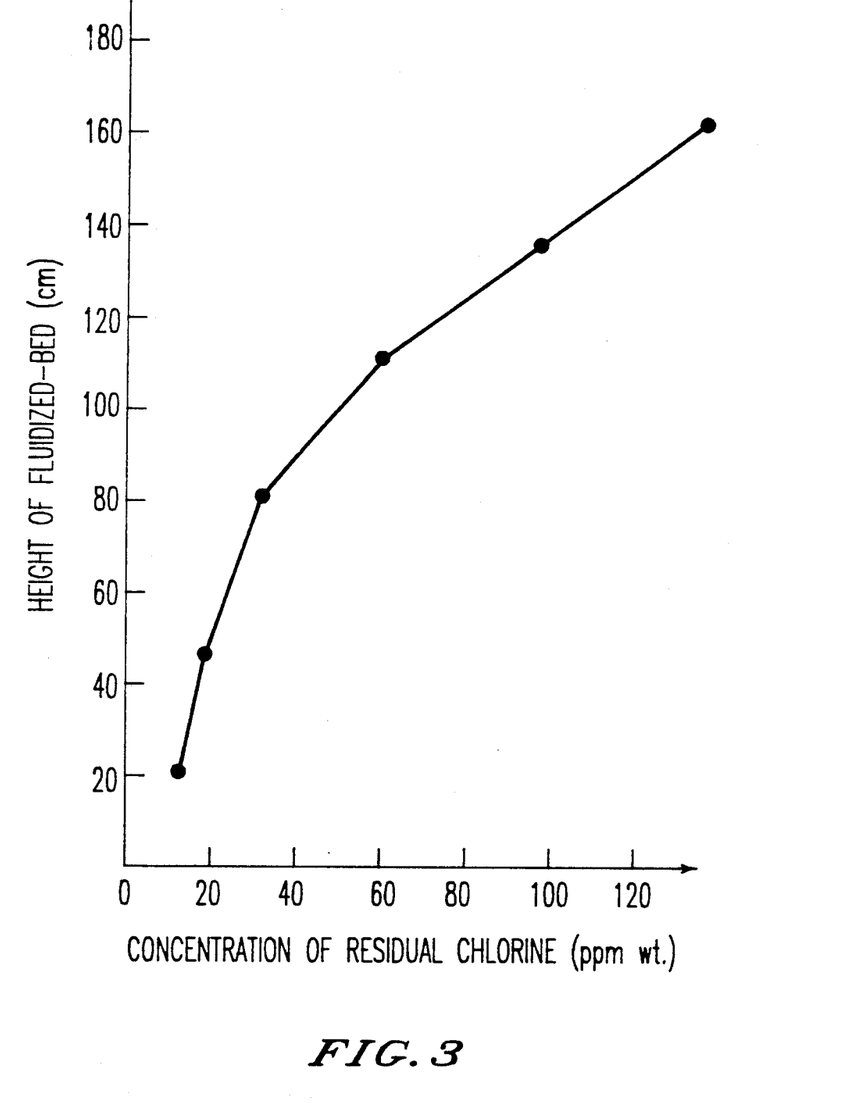
FIG. 3 is a graph showing the relationship between the residual chlorine concentration and the position in the fluidized bed.

The result is shown in FIG. 3. From FIG. 3, it may be seen that the residual chlorine concentration is lower in the silicon extracted from the neighborhood of the gas blowing-in part of the fluidized bed than in the upper part of the fluidized bed corresponding to the downstream part of gas.

Considering this discovery in detail, it appears that the gas blown in from the lower part of the fluidized bed in the fluidized bed reactor is flowing in a state approaching the piston flow, when the diameters of the fluidized particles in the fluidized bed are larger than about 0.4 mm, so that in regions where the flow velocity is not excessively large $$\left( \frac{U_o - U_{mf}}{U_{mf}} < 3 - 6 \right),$$

the fluidized bed reactor is in a state approaching that of an integrating type reactor. Hence, the silicon deposition rate and the residual chlorine concentration are different between the gas inlet part of the fluidized bed and the upper part of the fluidized bed where reaction has proceeded. From this, it was noticed that shortening the fluidized bed by cutting off the part corresponding to the downstream part surprisingly results in a lowered average value of residual chlorine concentration.

Then, the cause of change in the residual chlorine concentration along the route from the gas blowing-in part to the downstream part of gas was considered. Plotting the relationship between average deposition rate of silicon and residual chlorine concentration, concerning all experimental data, it was noticed that an intimate correlation exists between them, the residual chlorine concentration declining with increasing silicon deposition rate.

Figure 1:
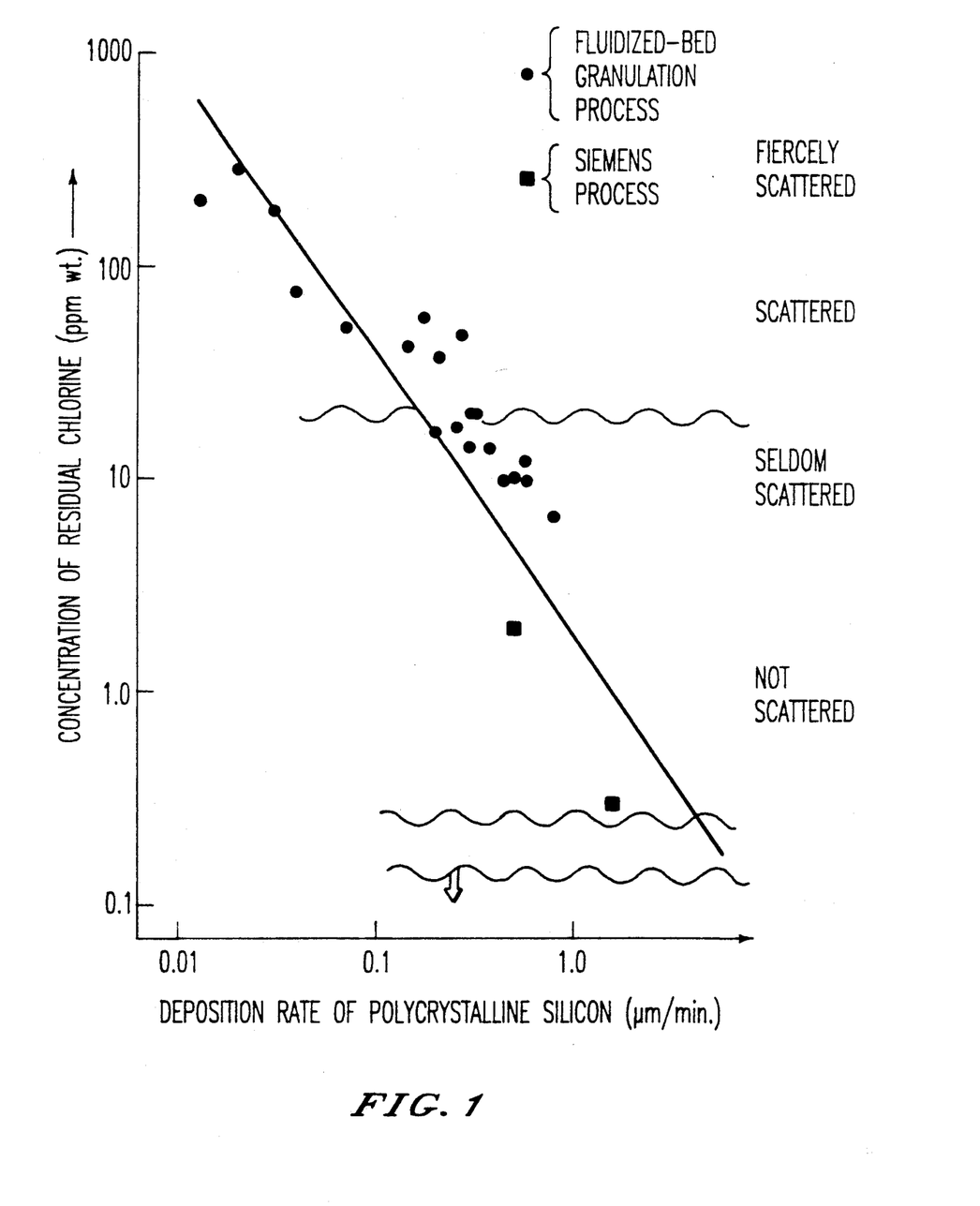
FIG. 1 is a graph showing the relationship between the silicon deposition rate and the residual chlorine concentration.

FIG. 1 plots the graph of this relationship. The experimental data contain those obtained with two types of reactors and with reaction temperature, chlorosilane gas concentration, height of fluidized bed, and particle diameter, for example, being varied. Under these conditions, the residual chlorine concentration strongly depends on the average deposition rate; the higher the rate, the lower the concentration. And when the average deposition rate is higher than 0.4 μm/min, the residual chlorine concentration is maintained below 20 ppm. In accordance with the present invention, it has been discovered that polycrystalline silicon granules in which the residual chlorine concentration is maintained below 20 ppm do not cause scattering of the silicon melt, even when they are adopted for process such as the CZ process.

By this token, according to the current fluidized bed granulation process, the silicon deposition rate is selected at around 0.1 μm/min; as a result of which, the residual chlorine concentration rises to up to 50–200 ppm by weight, causing violent scattering of the silicon melt.

The manufacturing method of the present invention enables manufacturing of high quality polycrystalline silicon with a low chlorine concentration which is suited for use in processes such as the for the CZ process by elevating the silicon deposition rate above about 0.4 μm/min.

In view of the above, a comprehensive description will now be provided of the necessary considerations for raising the deposition rate to higher than about 0 4 μm/min.

The silicon deposition rate G is given as a product of weight increase $\dot{W}$ and total surface area S:

$$G = \dot{W}/\rho S = \dot{W}/WS_v$$

where

ρ: Density of crystalline silicon (2.33 g/cm$^3$)

S$_v$ : Specific surface area of silicon particle $S = S_v \cdot V \cdot (1 - \epsilon_{FB})$ where V: Volume of fluidized bed $\epsilon_{FB}$: Voids (0.5–0.7)

The weight increase rate $\dot{W}$ is given by the equation given below as a function of gas flow rate F and mol fraction X of chlorosilane:

$$\dot{W} = \eta F_x M / Vn$$

where
Vn: Varies depending on temperature with regard to volume per 1 mol of gas
at 900° C., 96,250 cm³/mol
at 1,000° C., 104,450 cm³/mol
at 1,100° C., 112,650 cm³/mol
$\eta$: Proportion of silicon in material gas which is deposited
M: Atomic weight of silicon (28.08)
Accordingly, $$G = \frac{\eta_x M}{Vn \cdot \rho(1 - \epsilon_{FB})} \cdot \frac{1}{S_v t}$$

Thus the silicon deposition velocity is inversely proportional to $S_v t$. where $$t = V/F = L/u$$

L: Length of fluidized bed
u: Flow velocity of gas
$S_v$: Specific surface area of particle when the particle is spherical, $$S_v = 6/d$$

where
d: particle size
Therefore, $$G \propto d/t = du/L$$

To make G larger, it is effective to make the gas flow velocity u and particle size d larger, besides shortening the length L of the fluidized bed.

Having described the present invention, reference will now be made to certain Examples which are provided solely for illustration and are not intended to be limitative.

EXAMPLE 1

For example, when the reaction temperature = 1,050° C., concentration of SiHCl₃ x=0.5 (H₂ balance), particle size d=1 mm, and flow velocity u=100 cm/s, the result will be G>0.4 mm/min for L<7cm. The dwell time at this time is t−0.07 s. An assumption of $\eta = 0.2$ is made. See Kojima and Furusawa: Kagaku Kogaku (Chemical Engineering) Vol. 51 No. 3 P217-223 (1987)

However, if the dwell time t is extremely shortened, the material gas will pass through the bed, without reacting before approaching the equilibrium state, with a consequence of reduced silicon deposition proportion, $\eta$, resulting in lowered material utilization.

Accordingly, there exists an optimal range of dwell time t which meets these two requirements.

To further explain this relationship, in the silicon deposition method from the chlorosilane series (SiCl₄, SiH₂Cl₂ and SiH₃Cl), the reaction of depositing silicon and the reaction of etching silicon compete with each other, so that there exists a state of thermodynamic equilibrium which is determined by such conditions as gas mol ratio expressed by Cl/H, temperature and pressure, etc.

See E. Sirtl, L. P. Hunt and D. H. Sawyer: *J. Electrochem. Soc:* SOLID-STATE SCIENCE AND TECHNOLOGY, Vol 121, No. 7 P919-925 (1974)

As the reaction proceeds, the system approaches this state of thermodynamic equilibrium. This velocity is determined by the type of chlorosilane, mol ratio, pressure and mass transfer rate relative to gas-solid contact, for example.

It was confirmed that as shown by FIGS. 5 (A)-(D), when the reaction temperature is higher than 900° C., mol concentration of chlorosilane 20-50% and average diameter of particles larger than 0.8 mm, with the SiHCl₃—H₂ system, a state approaching to more than 90% of the aforementioned thermodynamic equilibrium state is brought about within a dwell time of about 0.10-0.30 sec and a state approaching to more than 95% thereof within about 0.13-0.40 sec. With the SiCl₄—H₂ system, it was confirmed that a state approaching to more than 90% of the thermodynamic equilibrium state is brought about within a dwell time of about 0.20-0.50 sec, and to more than 95% within about 0.25-0.65 sec. Also, with the SiH₂Cl₂—H₂ system, it was determined that 90-95% is reached within the same order of dwell time.

As described above, the equilibrium state is rapidly approached by thermal decomposition and hydrogen reduction reaction of chlorosilane at temperatures higher than 900° C. Accordingly, on an assumption that use is made of a fluidized bed reactor having 1.5-2.5m fluidized bed height, under the condition of:

Reaction temperature = 1,050° C.
H₂/SiHCl₃ = 1.0
Total pressure = 1 atm
Diameter of particles = 1.0 mm
Gas velocity = 120 cm/sec (at 1,050° C.)

the silicon deposition reaction is nearly completed about 40-60 cm above the gas blowing-in port of the dispersion plate and a near equilibrium state part where silicon deposition barely takes place is formed at a region over 110-210 cm thereabove.

Accordingly, in order to increase the silicon deposition rate and reduce residual chlorine in silicon granules, it is proper to set the reaction conditions such that in the fluidized bed particle part there should exist no region which is in the thermodynamic equilibrium state or a state approaching it as at the upper part of the fluidized bed as previously mentioned.

Thus, when the mol ratio of H₂/chlorosilane, average particle size of Si granules in the fluidized bed, flow velocity of material gas, etc., are identical, the amount of residual chlorine in the product silicon granules is smaller under the reaction condition of lower fluidized bed height or near equilibrium state being reduced than under the reaction condition of high bed or near-equilibrium region being large. However, if the fluidized bed height is extremely lowered, the percentage utilization of material gas will decline, with resultant lowered productivity.

In taking the balance between both extremes, it is desirable to cut off at least the part of the bed where the degree of attainment of thermodynamic equilibrium is higher than 90-95%. This means requiring the dwell time of the reaction gas in the fluidized bed to be less than 0.50 sec, or preferably, less than 0.30 sec.

The effect of reducing the residual chlorine concentration by cutting off the region being in a near thermodynamic equilibrium state in the fluidized bed particle part has the effect of having no region where the silicon deposition rate is low. Thus, decreasing the reaction rate by lowering the reaction temperature, to lengthen the time of reaching the thermodynamic equilibrium state, thereby reducing the region being in a near equilibrium state in the upper part of the fluidized bed, will bring about inverse effect.

With regard to the silicon deposition rate, it would appear at first that the larger this rate, the larger the residual chlorine. However, the inverse relation is observed instead. The reason appears to be as follows.

Figure 2A:
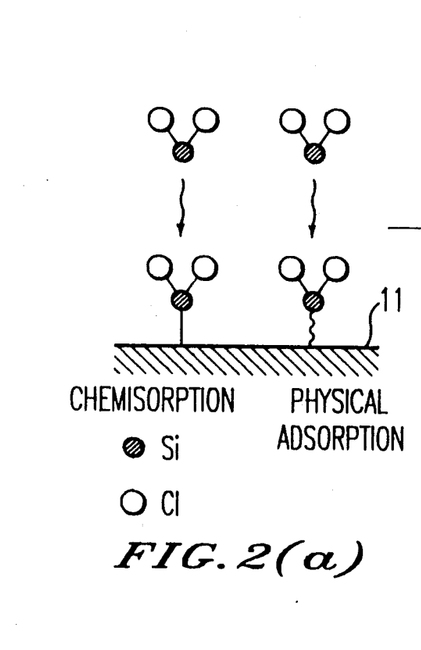
FIG. 2 is a diagram showing a silicon deposition mechanism.
Figure 2B:
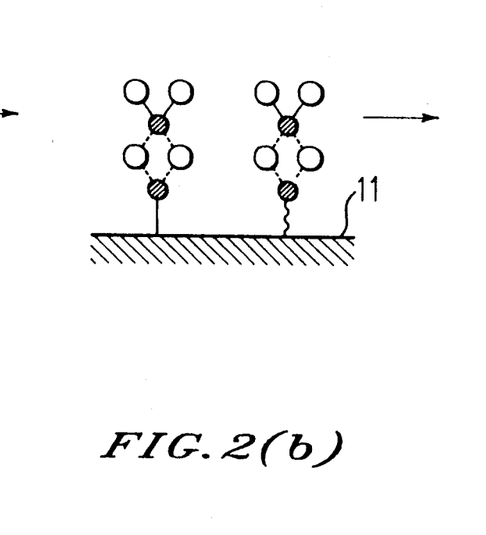
Figure 2C:
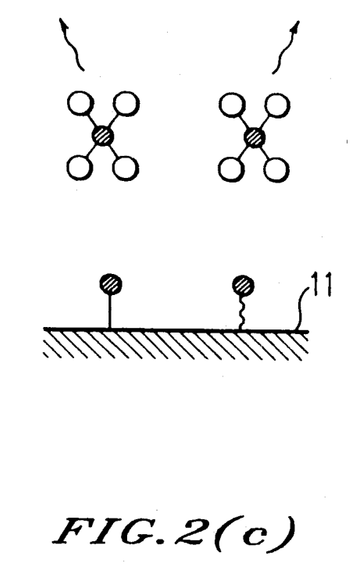

The formation of silicon from the chlorosilane gas/hydrogen system by way of CVD is believed to result from chemical and physical adsorption on the sites on the silicon surface of the intermediate product $SiCl_2$ which generates from chlorosilane gas ($SiH_2Cl_2$, $SiHCl_3$ and $SiCl_4$), followed by surface reaction (R1 and R2) of this adsorbed $SiCl_2$ with $SiCl_2(g)$ and $H_2(g)$ in the gas (FIG. 2).

$SiCl_2$ (adsorbed) + $SiCl_2(g)$ Si (solid) + $SiCl_4(g)$ ... R1

$SiCl_2$ (adsorbed) + $H_2(g)$ Si (solid) + $2HCl(g)$ ... R2

The removal rate of Cl from $SiCl_2$ adsorbed on the silicon surface depends on the reaction rate of the reactions R1 and R2. While the ratio of reaction R1 to reaction R2 varies depending on the reaction conditions, when $H_2/TCS = 1-4$ and P total = 1 atm, reaction R1 plays the predominant role. Thus, $SiCl_2$ attacks the $SiCl_2$ adsorbed on the surface of the silicon substrate 11, separating $Cl_2$ from the adsorbed $SiCl_2$. In this way, by repeating the adsorption of $SiCl_2$ and removal of $Cl_2$, only Si goes on being deposited on the silicon substrate 11.

However, the adsorption of $SiCl_2$ occurs in two ways, as described above, one being chemical and the other physical. The $SiCl_2$ physically adsorbed is moving on the surface of the silicon substrate 11. When the silicon deposition rate is slow, the attack on the physically adsorbed $SiCl_2$ is slight; therefore, the Cl remaining unremoved will move about for a long time on the surface of the silicon substrate 11. Since the silicon substrate 11 is polycrystalline silicon, there exists on the surface thereof pinholes, vacancies, etc., of crystal domain or on the atomic level, so that the $SiCl_2$ molecules which are moving about the surface fall into them, thus becoming immune to the attack. Further, even if they can be attacked, sometimes $Cl_2$ will not be removed on account of adverse access angle or orientation of the face. As a result, Cl will continue being deposited together with Si. Conversely, if the silicon deposition rate is rapid, the physically adsorbed $SiCl_2$ is immediately attacked, so that Cl may be rapidly removed.

The above-described reasoning may be qualitatively verified as follows:

The deposition rates of silicon and chlorine atoms per unit surface area of silicon granules are given by the undermentioned equations:

$$\dot{N}_{si} = c\theta t_{si}^{-1}$$

$$\dot{N}_{cl} = 2c\theta t_{cl}^{-1}$$

Where
c: Number of adsorption site of $SiCl_2$ per unit surface area $\theta$: Proportion of the number of sites having $SiCl_2$ actually adsorbed thereon to the aforementioned number $t_{si}$: Average value of the time before one molecule of $SiCl_2$ is attacked by the gas molecule, after it has been adsorbed by the granule surface $t_{cl}$: Average value of the time before one molecule of $SiCl_2$ falls into a pinhole or vacancy, etc., on the granule surface, after it has been adsorbed by the surface. According to the kinetic theory of gases:

where
Pi: Partial pressure of the i-th component of the material gas

Mi: Molecular weight of the i-th component of the material gas $q_A$: Reacting cross-section of $SiCl_2$ $N_A$: Avogadro constant ($6.022 \times 10^{23}$ mol$^{-1}$)

R: Gas constant (8.314 J mol$^{-1}$ K$^{-1}$)

T: Absolute temperature of material gas

Which temperature is constant, C, $\theta$ and $t_{cl}$ are all considered to be constant; therefore $N_{cl}$ is constant.

On the other hand, as the partial pressure of any one of components has increased, $t_{si}$ will be retrenched and $N_{si}$ becomes larger. The silicon deposition rate $G = \dot{N}_{si}/N_v$ follows suit. $N_v$ designates the number of silicon atoms ($5.00 \times 10^{22}$ atoms/cc) in unit volume. That:

$$\dot{N}_{cl} = \dot{N}_{si}Cl = N_v G[Cl]$$

is constant means that the chlorine concentration [Cl] is inversely proportional to the silicon deposition rate G.

FIG. 3 suggests that the residual chlorine concentration differs greatly between the gas blowing-in part and the downstream part of gas. However, as the average [Cl] is taken of the residual chlorine concentration all over the fluidized bed, followed equations are derived:

$$[\overline{Cl}] = \int_v G(ir)[Cl]drir / \int_v G(ir)dir$$
$$= (\dot{N}_{cl}/N_v)V / \int_v G(ir)dir$$
$$\overline{G} = \int_v G(ir)dir / \int_v dir = \int_v G(ir)dir/V$$

thus, attesting to the validity of $\dot{N}_{cl} = \dot{N}_v \overline{G} [\overline{Cl}] \cdot V$ signifies volume of the fluidized bed.

The value of $\dot{N}_{cl}$ was found to be $4.6 \times 10^{11}$ cm$^{-1}$S$^{-1}$ or $2.8 \times 10^{13}$ cm$^{-2}$min$^{-1}$ in embodiments of this invention.

In the Siemens process heretofore practiced, there has been found almost no chlorine remaining. This is also attributable to high silicon deposition rate.

Tables 1-3 list results of application of this invention, as contrasted with comparative examples:

TABLE 1

| | Comparative example(s) TEST-11 | Examples of this invention | | | |
|---|---|---|---|---|---|
| | | TEST-12 | TEST-13 | TEST-14 | TEST-15 |
| Fluidized bed temperature (°C.) | 1050 | | 1050 | 1050 | 1050 |
| SiHCl$_3$/H$_2$ | 0.1 | | 1 | 1 | 2 |
| Average diameter of particles (mm) | 0.5 | 1.5 | 0.8 | 0.8 | 0.8 |
| Flow velocity (cm/s) | 80 | 150 | 110 | 140 | 110 |

TABLE 1-continued

|  | Comparative example(s) TEST-11 | Examples of this invention | | | |
|---|---|---|---|---|---|
|  |  | TEST-12 | TEST-13 | TEST-14 | TEST-15 |
| Fluidized bed height (cm) | 120 | 90 | 90 | 90 | 90 |
| Average deposition rate (μm/min) | 0.1 | 0.7 | 0.4 | 0.5 | 0.6 |
| Residual chlorine concentration (ppm wt) | 120 | 10 | 20 | 12 | 12 |

TABLE 2

|  | Comparative example(s) | | Examples of this invention | | |
|---|---|---|---|---|---|
|  | TEST-21 | TEST-22 | TEST-23 | TEST-24 | TEST-25 |
| Fluidized bed temperature (°C.) | 950 | 1050 | 1050 | 1100 | 1100 |
| SiHCl$_3$/H$_2$ | 1 | 0.05 | 1 | 1 | 1 |
| Average diameter of particles (mm) | 0.8 | 0.8 | 0.8 | 0.8 | 1.0 |
| Flow velocity (cm/s) | 70 | 70 | 70 | 110 | 110 |
| Fluidized bed height (cm) | 30 | 30 | 30 | 50 | 80 |
| Average deposition rate (μm/min) | 0.2 | 0.06 | 0.4 | 0.5 | 0.5 |
| Residual chlorine concentration (ppm wt) | 30 | 160 | 18 | 16 | 17 |

TABLE 3

|  | Comparative example (s) TEST-31 | Examples of this invention | | | | Comparative example (s) | |
|---|---|---|---|---|---|---|---|
|  |  | TEST-32 | TEST-33 | TEST-34 | TEST-35 | TEST-36 | TEST-37 |
| Fluidized bed temperature (°C.) | 1050 | 1050 | 1050 | 1000 | 1050 | 900 | 900 |
| SiHCl$_3$/H$_2$ | 1 | 1 | 1 | 1 | 1 | 1 | 1 |
| Diameter of fluidized bed paricles (m/m) | 0.5~2 | 0.5~2 | 0.5~2 | 0.5~2 | 0.7~2 | 0.5~2 | 0.5~2 |
| Flow velocity (cm/s) | 80 | 80 | 160 | 100 | 150 | 100 | 80 |
| Fluidized bed height (cm) | 180 | 50 | 100 | 50 | 100 | 150 | 180 |
| Total pressure (atm) | 1 | 1 | 1 | 1 | 1 | 1 | 1 |
| Average deposition rate (μm/min) | 0.06 | 0.5 | 0.4 | 0.6 | 0.6 | 0.08 | 0.05 |
| Residual chlorine concentration (ppmwt) | 150 | 14 | 18 | 10 | 12 | 110 | 180 |
| Volume of near equilibrium region[1] / Volume of Si Depositing region | 3~5 | 0.2~0.5 | 0.1~0.4 | 0.1~0.3 | 0.2~0.5 | 0.1~0.3 | 1~1.5 |

[1] Near equilibrium region: Bed part where the degree of reaching the thermodynamic equilibrium is higher than 90%
Si Depositing region: Bed part where the degree of reaching the thermodynamic equilibrium is not higher than 90%.

Tables 1 through 3 list test results obtained with a reactor tube of 100 mm ID and 1,800 mm height using a dispersion plate of single orifice type.

In TEST-11, the manufacture of polycrystalline silicon is made on a general condition setting for the current fluidized bed granulation process. The silicon deposition rate is as low as 0.1 μm/min and the residual chlorine concentration has reached 120 ppm by weight. In contrast in TESTS 12-15, a silicon deposition rate higher than 0.4 μm/min is ensured and the residual chlorine content is kept below 20 ppm by weight through adjustments of various conditions.

Similar results were obtained also in TESTS 21-25.

In TEST 31, manufacture of polycrystalline silicon was made under conditions of H$_2$/SiHCl$_3$=1, temperature 1,050° C., bed height 180 cm and flow velocity 80 cm/sec. The reaction has been attained to more than nearly 90% of the equilibrium around 35 cm above the dispersion plate, the part over 150 cm thereabove forming a very small deposition rate region where Si deposition rate is low. In the silicon granules manufactured under the above-mentioned conditions, 150 ppm by weight of residual chlorine was found, as measured by neutron activation analysis.

In contrast, in TEST-32, the reaction conditions are set at H$_2$/SiHCl$_3$=1, temperature=1,050° C., bed height 50 cm, and flow velocity 80 cm/sec. Under these conditions, where the reaction region being in a state of near thermodynamic equilibrium is cut off, unlike in TEST-31, the residual chlorine concentration in the silicon granules has been reduced down to 14 ppm by weight.

While TEST-32, the thermodynamic equilibrium region was eliminated by directly lowering the bed height, similar effect may be achieved by increasing the flow velocity. This is illustrated by TEST-33.

Selected as the reaction conditions are H$_2$/SiHCl$_3$- 1, temperature=1,050° C., bed height=100 cm and flow velocity 160 cm/sec. The reaction has nearly completed around 85 cm above the dispersion plate, only 18 ppm by weight of residual chlorine being measured in the silicon granules obtained under the above-mentioned conditions.

In TESTS-34-35 also, the residual chlorine is very small.

TESTS-36 and -37 present examples of removing the equilibrium region by lowering the reaction rate. In both cases, the silicon deposition rate is low, with the residual chlorine concentration high.

For example, in TEST-36, the condition setting is made to H$_2$/SiHCl$_3$=1, temperature=900° C., bed height =150 cm and flow velocity=100 cm/sec. The silicon depositing reaction has been completed near 120-130 cm above the dispersion plate and the region where the equilibrium state has been reached is over about 20-30 cm, but 110 ppm by weight of residual chlorine exists in the silicon granules produced under the above-mentioned conditions for trial.

Note that in the above-described Examples, SiHcl$_3$ is used as chlorosilane, but SiCh$_4$, SiH$_2$Cl$_2$ or SiH$_3$Cl may be used, or further, any mixture of them may be used. Besides, the dilution gas to be combined with chlorosilane is not restricted to H$_2$ which is used in the above-mentioned Examples, but as such as gas, Are, He, N$_2$ or the like may be employed singly or in combination.

Having described the present invention, it will be apparent to one skilled in the art that many changes and modifications may be made to the embodiments disclosed while remaining within the scope and spirit of the present invention.

What is claimed as new and desired to be secured by letters patent of the United States is:

1. A method of manufacturing high-purity silicon crystals having a residual chlorine content of less than 20 ppm, which comprises depositing silicon on the surface of high-purity silicon particles, while feeding into a fluidized bed reactor at a high temperature a material gas consisting of high-purity chlorosilane and a diluting gas, said method having a silicon deposition rate in excess of about 0.4 μm/minute.

2. The method of claim 1, wherein the temperature inside said fluidized bed reactor is about 900°–1,110° C.

3. The method of claim 1, wherein said chlorosilane is selected from the group consisting of tetrachlorosilane, trichlorosilane, dichlorosilane and mixtures thereof.

4. The method of claim 1, wherein the mol concentration of chlorosilane is above about 20%, and below about 50%.

5. The method of claim 1, wherein said diluting gas is selected from the group consisting of hydrogen, argon, helium, nitrogen and mixtures thereof.

6. The method of claim 1, the reaction gas in the fluidized bed has a flow velocity above about 60 cm/sec, and below about 200 cm/sec.

7. The method of claim 1, wherein the silicon particles have an average particle size of greater than 0.8 mm.

8. The method of claim 1, wherein the reaction has an average dwell time in the fluidized bed of less than about 0.5 sec.

9. The method of claim 1, wherein the fluidized bed has a height of about 30–150 cm.

10. A method of manufacturing high-purity polycrystalline silicon granules having a residual chlorine content of less than 20 ppm, which comprises depositing silicon on the surface of high-purity silicon particles, while feeding a material consisting of high-purity chlorosilane and dilution gas in a fluidized bed reactor at a high temperature, wherein the fluidized bed reactor is at a temperature higher than 900°–1,100° C.; said chlorosilane having a mole concentration in the material gas of above about 20% but below about 50%; the average particle size of silicon particles being larger than about 0.8 mm; and the average dwell time of the material gas in the fluidized bed being less than about 0.5 sec.

11. The method of claim 10, wherein said diluting gas is selected from the group consisting of hydrogen, argon, helium, nitrogen and mixtures thereof.

12. The method of claim 10, wherein said reaction gas has a flow velocity in the fluidized bed of greater than about 60 cm/sec, and less than about 200 cm/sec.

13. The method of claim 10, wherein said chlorosilane is selected from the group consisting of tetrachlorosilane, trichlorosilane, dichlorosilane and mixtures thereof.

* * * * *